(12) United States Patent
Berry

(10) Patent No.: US 11,622,235 B2
(45) Date of Patent: Apr. 4, 2023

(54) GESTURE BASED SECURITY SYSTEM

(71) Applicant: Carrier Corporation, Palm Beach Gardens, FL (US)

(72) Inventor: Greg Berry, Duluth, GA (US)

(73) Assignee: Carrier Corporation, Palm Beach Gardens, FL (US)

(*) Notice: Subject to any disclaimer, the term of this patent is extended or adjusted under 35 U.S.C. 154(b) by 65 days.

(21) Appl. No.: 17/255,196

(22) PCT Filed: Dec. 12, 2019

(86) PCT No.: PCT/US2019/065933
§ 371 (c)(1),
(2) Date: Dec. 22, 2020

(87) PCT Pub. No.: WO2020/123780
PCT Pub. Date: Jun. 18, 2020

(65) Prior Publication Data
US 2021/0211843 A1    Jul. 8, 2021

Related U.S. Application Data

(60) Provisional application No. 62/779,528, filed on Dec. 14, 2018.

(51) Int. Cl.
*H04W 4/029* (2018.01)
*H04W 4/80* (2018.01)
(Continued)

(52) U.S. Cl.
CPC ............ *H04W 4/029* (2018.02); *G06F 3/011* (2013.01); *G06F 3/017* (2013.01); *G06F 3/16* (2013.01);
(Continued)

(58) Field of Classification Search
None
See application file for complete search history.

(56) References Cited

U.S. PATENT DOCUMENTS 10,108,272 B1    10/2018   Debates et al.
2014/0049363 A1   2/2014   Ahearn et al.
(Continued)

OTHER PUBLICATIONS

International Preliminary Report on Patentability for International Application No. PCT/US2019/065933, dated Jun. 24, 2021.
(Continued)

*Primary Examiner* — Adolf Dsouza
(74) *Attorney, Agent, or Firm* — Carlson, Gaskey & Olds, P.C.

(57) ABSTRACT

An example security system includes a plurality of access control devices that each control access to a respective secured area. A mobile device includes a processor, an accelerometer, a wireless transceiver, and memory storing a credential. The processor is configured to receive an indication from the accelerometer, detect a user gesture based on the indication from the accelerometer indicating a pre-defined movement of the mobile device, determine a pathway based on the gesture that includes multiple ones of the secured areas, and utilize the wireless transceiver to automatically transmit the credential to the respective access control devices associated with each secured area of the pathway. An example method for a security system is also disclosed.

24 Claims, 4 Drawing Sheets

(51) Int. Cl.
    *G07C 9/28*     (2020.01)
    *G06F 3/01*     (2006.01)
    *G06F 3/16*     (2006.01)
    *G07C 9/00*     (2020.01)

(52) U.S. Cl.
    CPC .......... *G07C 9/00944* (2013.01); *G07C 9/28* (2020.01); *H04W 4/80* (2018.02); *G07C 2009/0096* (2013.01); *G07C 2209/63* (2013.01)

(56)              References Cited

U.S. PATENT DOCUMENTS

| | | |
|---|---|---|
| 2018/0302416 A1 | 10/2018 | Einberg et al. |
| 2019/0286806 A1* | 9/2019 | Robinson ............ H04L 63/0853 |
| 2020/0168017 A1* | 5/2020 | Prostko .............. G07C 9/00563 |

OTHER PUBLICATIONS

International Search Report and Written Opinion for International Application No. PCT/US2019/065933 dated Mar. 27, 2020.

* cited by examiner

GESTURE BASED SECURITY SYSTEM

CROSS-REFERENCE TO RELATED APPLICATIONS

This application claims priority to U.S. Provisional Application No. 62/779,528, which was filed on Dec. 14, 2018, and is incorporated by reference in its entirety.

BACKGROUND

This application relates to providing access to secured areas, and more particularly to providing access to a sequence of secured areas based on accelerometer data from a mobile device.

Many buildings include secured areas that require a user credential for entry. For example, some buildings require a credential, such as a passcode or a scannable badge for accessing certain secured areas. Repeatedly having to provide one's credential is a cumbersome process, particularly when multiple secured areas are accessed in a short period of time.

SUMMARY

A security system according to an example of the present disclosure includes a plurality of access control devices that each control access to a respective secured area. A mobile device includes a processor, an accelerometer, a wireless transceiver, and memory storing a credential. The processor is configured to receive an indication from the accelerometer, detect a user gesture based on the indication from the accelerometer indicating a predefined movement of the mobile device, determine a pathway based on the gesture that includes multiple ones of the secured areas, and utilize the wireless transceiver to automatically transmit the credential to the respective access control devices associated with each secured area of the pathway.

In a further embodiment of any of the foregoing embodiments, the pathway comprises an ordered sequence of said multiple ones of the secured areas, and the mobile device is configured to transmit the credential to each of said respective access control devices to provide access to said multiple ones of the secured areas in a same order as the ordered sequence.

In a further embodiment of any of the foregoing embodiments, the gesture includes a plurality of predefined discrete movements of the mobile device.

In a further embodiment of any of the foregoing embodiments, the gesture includes a pause of a predefined duration occurring between at least two of the discrete movements.

In a further embodiment of any of the foregoing embodiments, the gesture includes one or more taps on the mobile device.

In a further embodiment of any of the foregoing embodiments, the gesture includes a predefined bodily movement of a user holding or transporting the mobile device.

In a further embodiment of any of the foregoing embodiments, the gesture includes a change in walking speed of a user transporting the mobile device.

In a further embodiment of any of the foregoing embodiments, the gesture includes a predefined arm-based movement trajectory of the mobile device.

In a further embodiment of any of the foregoing embodiments, the mobile device includes a microphone and the processor is configured to record audio from the microphone based on detection of the user gesture, determine whether the recorded audio includes a predefined audio signature, and determine the pathway further based on the predefined audio signature being detected in the recorded audio.

In a further embodiment of any of the foregoing embodiments, the wireless transceiver is configured to communicate with said respective access control devices using BLUETOOTH, WiFi, Zigbee, or Near-Field Communication.

An example method for a security system according to an example of the present disclosure includes detecting a user gesture based on an indication from an accelerometer of a mobile device indicating a predefined movement of the mobile device; determining a pathway based on the gesture that includes a plurality of secured areas, each secured area having an associated access control device that controls access to the secured area; and automatically transmitting a credential from the mobile device to the respective access control devices associated with each respective secured area of the pathway based on said detecting and determining.

In a further embodiment of any of the foregoing embodiments, the pathway includes an ordered sequence of multiple secured areas and said automatically transmitting includes transmitting the credential to the respective access control devices to provide access to said plurality of secured areas in a same order as the ordered sequence.

In a further embodiment of any of the foregoing embodiments, the gesture includes a plurality of predefined discrete movements of the mobile device.

In a further embodiment of any of the foregoing embodiments, the gesture includes a pause of a predefined duration occurring between at least two of the discrete movements.

In a further embodiment of any of the foregoing embodiments, the gesture includes one or more taps on the mobile device.

In a further embodiment of any of the foregoing embodiments, the gesture includes a predefined bodily movement of a user holding or transporting the mobile device.

In a further embodiment of any of the foregoing embodiments, the gesture includes a change in walking speed of a user transporting the mobile device.

In a further embodiment of any of the foregoing embodiments, the gesture includes a predefined arm-based movement trajectory of the mobile device.

In a further embodiment of any of the foregoing embodiments, the method includes recording audio from a microphone of the mobile device based on detection of the user gesture, determining whether the recorded audio includes a predefined audio signature, and determining the pathway further based on the predefined audio signature being detected in the recorded audio.

In a further embodiment of any of the foregoing embodiments, automatically transmitting includes transmitting the credential using BLUETOOTH, WiFi, Zigbee, or Near-Field Communication.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1A:
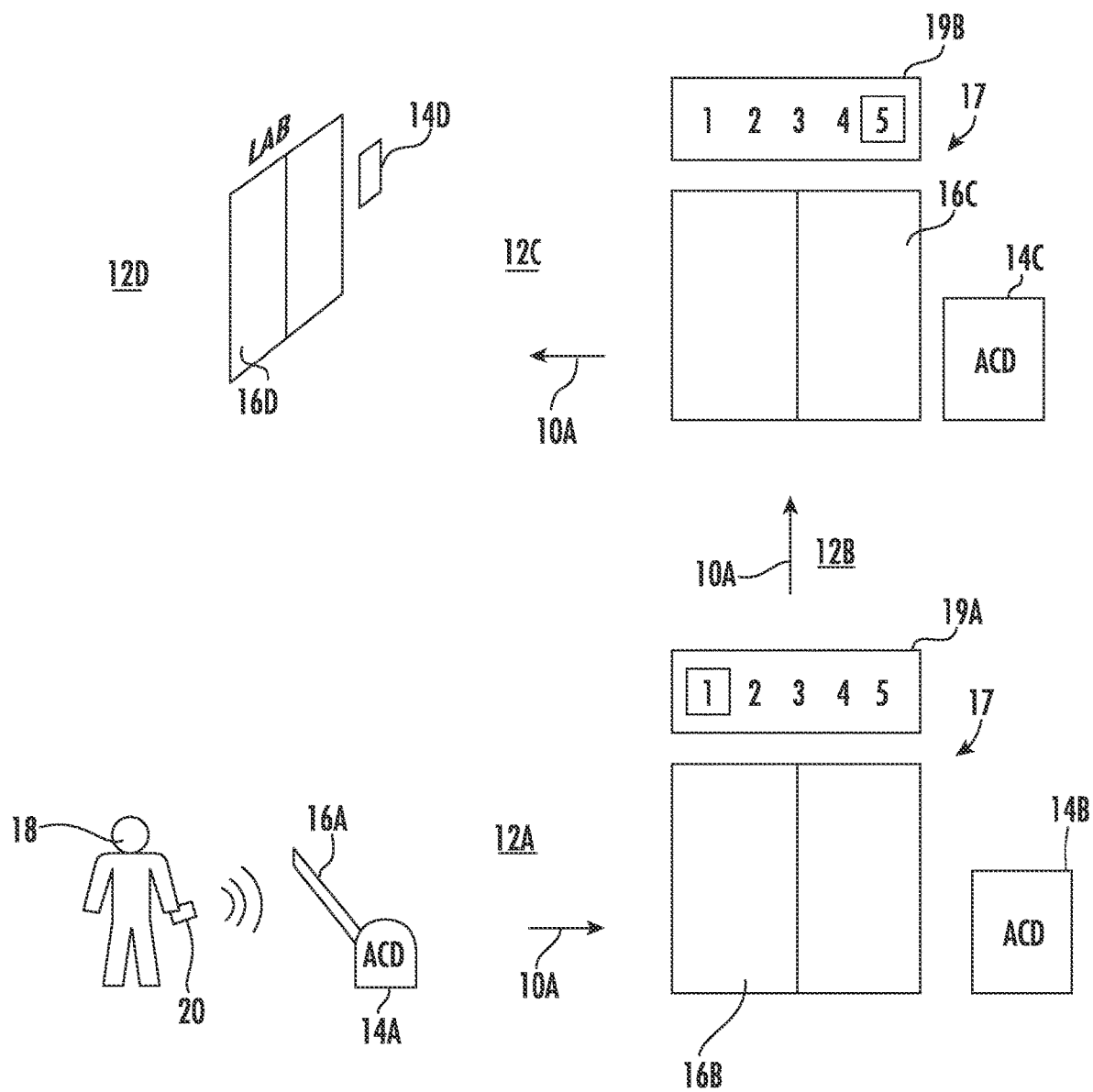
FIG. 1A schematically illustrates an example pathway that includes an ordered sequence of secured areas.

FIG. 1A schematically illustrates an example pathway 10A to a lab 12D. The pathway 10A includes a plurality of secured areas 12A-D, each having an associated access control device 14A-D and movable barrier 16A-D (e.g., a turnstile, gate, door, or the like).

A user 18 has a mobile device 20 on their person which has a stored credential corresponding to the user 18. The mobile device 20 is operable to detect a movement-based gesture of the mobile device 20 by the user 18 from accelerometer data of the mobile device 20, determine a pathway 10 associated with the gesture, and automatically transmit the stored credential to the respective access control devices 14 associated with each respective secured area 12 of the pathway 10 based on the detected gesture. This enables the user 18 to travel along their desired pathway 10 without requiring the user 18 to take an affirmative step to provide their credential to each access control device 14 along the pathway 10.

For the discussion below, assume that the user 18 has provided a first gesture to the mobile device 20 that corresponds to the pathway 10A. The example pathway 10A includes passage through an ordered sequence of secured areas 12A, 12B, 12C, 12D. The secured areas 12A-D have respective associated access control devices 14A-D. The user approaches a first access control device 14A. The mobile device 20 determines that access control device 14A corresponds to a first secured area of the pathway 10A and transmits the credential to the access control device 14A. Upon receiving the credential from mobile device 20, access control device 14A authenticates the credential, and if successfully authenticated provides for movement of the barrier 16A (e.g., rotation of a turnstile or lifting of a gate) to access to secured area 12A.

The user 18 approaches elevator 17 and the mobile device 20 automatically transmits the credential to access control device 14B. Upon successfully authenticating the credential, doors 16B of the elevator 17 are opened and the user 18 is able to enter the secured area 12B, which corresponds to a car of the elevator 17. As shown by indicator 19A, the elevator car 12B is at a first floor upon entry of the user 18.

The elevator car 12B advances to a fifth floor as shown by indicator 19B, and access control device 14C, upon successfully authenticating the credential, provides access to a secured area 12C by opening doors 16C. The user 18 advances towards access control device 14D, and the mobile device 20 automatically transmits the credential to the access control device 14D. The access control device 14D authenticates the credential and upon successful authentication provides access to a secured area 12D by enabling opening of doors 16D.

Figure 1B:
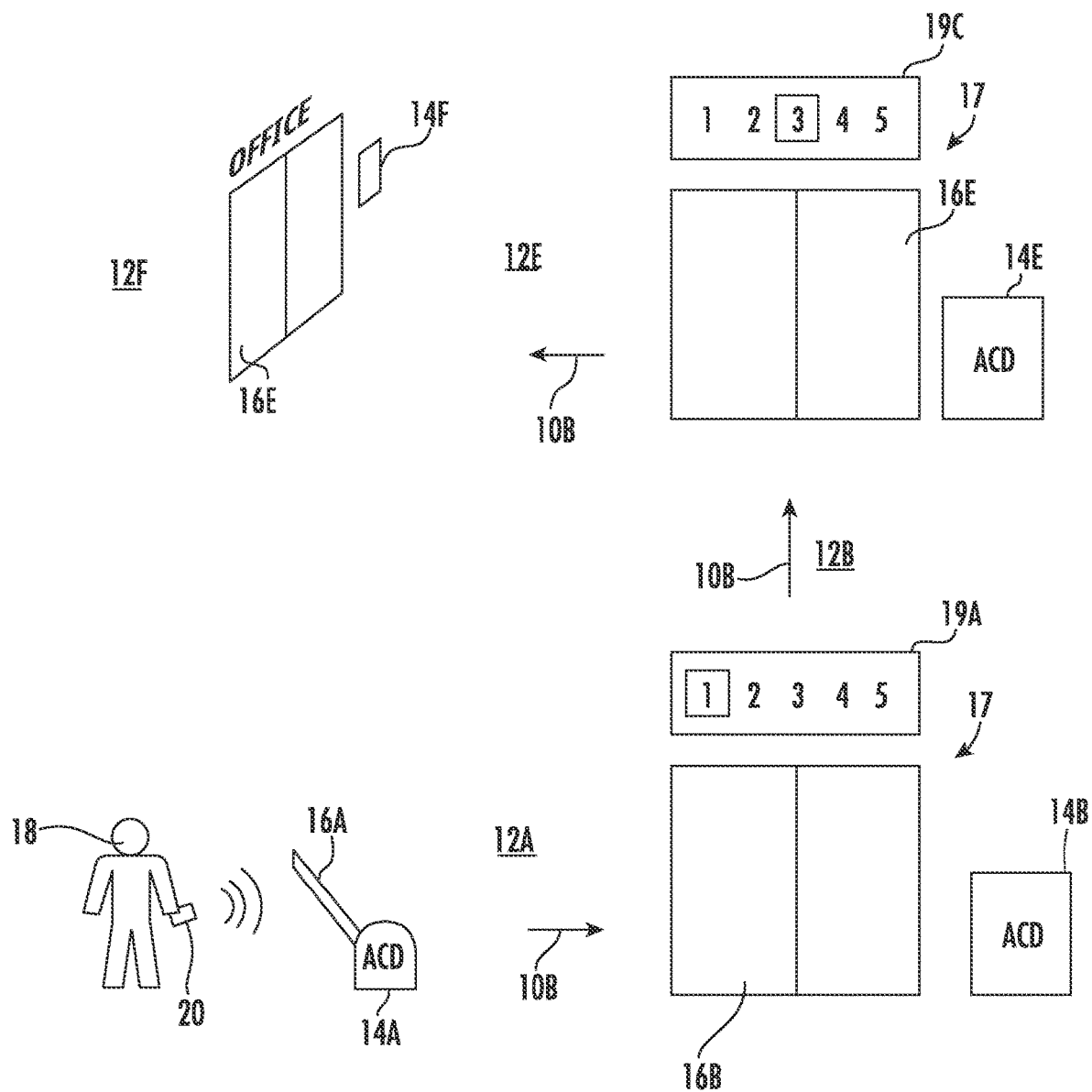
FIG. 1B schematically illustrates another example pathway that includes another ordered sequence of secured areas.

Referring now to FIG. 1B, a different example pathway 10B is shown that provides for access to an office 12E of the user 18. The pathway 10B includes the following ordered sequence of secured areas 12A, 12B, 12E, 12F. The pathway 10B provides for the elevator car 12B transporting the user 18 exiting to a third floor (see indicator 19C), at which the mobile device 20 transmits the credential to access control device 14E, which opens doors 16E to provide access to a secured area 12E. Upon approaching an access control device 14F for the office 12F, the mobile device 20 automatically transmits the user's credential to the access control device 14F, which authenticates the credential and provides access to the office 12F through doors 16F.

In the examples, discussed above, each pathway 10A-B includes an ordered sequence of secured areas 12, and the mobile device 20 is configured to transmit the credential to each respective access control device 14 associated with each secured area 12 of the pathway 10 in a same order as the ordered sequence. For example, for pathway 10A the ordered sequence is 12A, 12B, 12C, 12D, and for pathway 10B the ordered sequence is 12A, 12B, 12E, 12F. In other examples, the user 18 may be able to traverse the pathway in different orders (e.g., backtracking within the pathway and then advancing and/or traversing the pathway in reverse).

The gesture associated with each pathway 10 includes one or more predefined discrete movements of the mobile device 20. Each discrete movement could include any one or more of the following, for example:

As a tap of the mobile device while held by the user 18 or suspended in the user's pocket or bag.

A change in a walking speed pattern of the user 18 that is transporting the mobile device 20 (e.g., holding, or storing in their pocket or purse or backpack). For example, if a user slows from their normal walking pace to a slowed pace for a predefined time period, that could serve as a gesture indicating a desired path.

A bodily movement of a user holding or transporting the mobile device (e.g., a spin, a jump, etc.).

An arm-based movement trajectory of the mobile device (e.g., movement in a circle, a swoop motion, a side-to-side motion, an up-down motion, etc.).

In one example, the gesture also includes a pause of a predefined duration occurring between at least two movements in the gesture. For example, a gesture for pathway 10A could include three successive taps of the mobile device, and a gesture for pathway 10B could include two successive taps followed by a pause of a predefined duration, followed by a third tap.

Because each gesture is based on accelerometer data, the speed of movement of the mobile device 20 can be part of the gesture (e.g., swoop at first speed for first gesture and swoop at different second speed for second gesture).

As discussed in the examples above, the movement of the mobile device 20 can be conveniently provided by the user 18 to indicate a desired pathway, without requiring the user to repeatedly take affirmative steps to provide their credential at each access control device 14 along the desired pathway.

Figure 2:
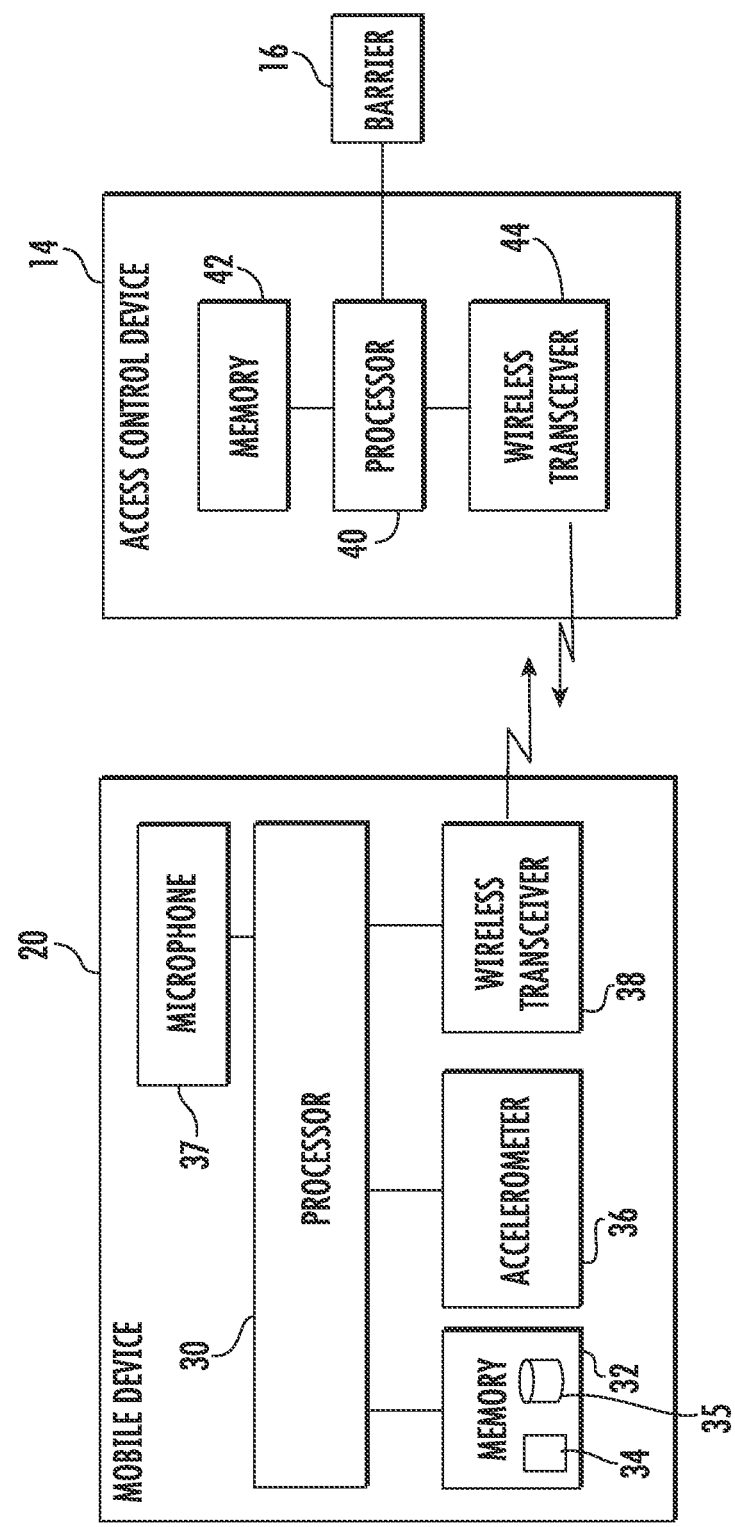
FIG. 2 schematically illustrates an example mobile device and access control device.

FIG. 2 schematically illustrates in example mobile device 20 and an example access control device 14. The mobile device 20 includes a processor 30, memory 32, an accelerometer 36, a microphone 37, and a wireless transceiver 38. The processor 30 may include one or more microprocessors, microcontrollers, application-specific integrated circuits (ASICs), or the like, for example. The memory 32 may include one of several types of memory such as read-only memory (ROM), random-access memory, cache memory, flash memory devices, optical storage devices, etc. The memory 32 stores a credential 34 for the user 18, and a database 35 containing mappings between movement-based gestures of the mobile device 20 and corresponding pathways 10. Alternatively, the database 35 could be stored on another device (e.g., a server or the like).

The accelerometer 36 is operable to detect one or more discrete movements of the mobile device 20. The processor 30 cooperates with the accelerometer 36 to obtain an indicator that includes accelerometer data from the accelerometer 36. The processor 30 determines whether the indicator, which is indicative of one or more discrete movements of the mobile device 20, corresponds to any predefined user gestures corresponding to pathways 10 stored in the database 35.

The microphone 37 is operable to record audio from the user 18. In one example, the processor 30 is configured to record audio from the microphone 37 based on detection of a user gesture, determine whether the recorded audio includes a predefined audio signature, and determine the pathway 10 further based on the predefined audio signature being detected in the recorded audio.

In one example, the recorded audio can be non-verbal (e.g., a clap, a finger snap, a knock on the phone, etc.). In one example, the recorded audio can be verbal (e.g., tap phone to initiate recording, and then provide vocal indicator of path such as "lobby to lab" or "lobby to office"). In such examples, the processor 30 can further determine a pathway, and correspondingly which access control devices 14 should automatically receive the credential 34, based on the audio recording.

The wireless transceiver 38 is operable to automatically transmit the credential 34 to the access control devices 14 of a determined pathway. In one example the wireless transceiver uses BLUETOOTH signaling protocol (IEEE 802.15.1). Of course, other protocols could be used, such as, e.g., WiFi (IEEE 802.11), Zigbee (IEEE 802.15.4), Near-Field Communication (NFC).

The access control device 14 includes a processor 40, memory 42, and a wireless transceiver 44. Similar to the mobile device 20, the processor 40 may include one or more microprocessors, microcontrollers, ASICs, or the like, for example, and the memory 42 may include one of several types of memory such as read-only memory (ROM), random-access memory, cache memory, flash memory devices, optical storage devices, etc. The wireless transceiver 44 of access control device 14 is operable to communicate with the wireless transceiver 38 of mobile device 20. Also, the processor 40 is operatively connected to barrier 16 to control whether movement of the barrier 16 is performed/permitted.

Figure 3:
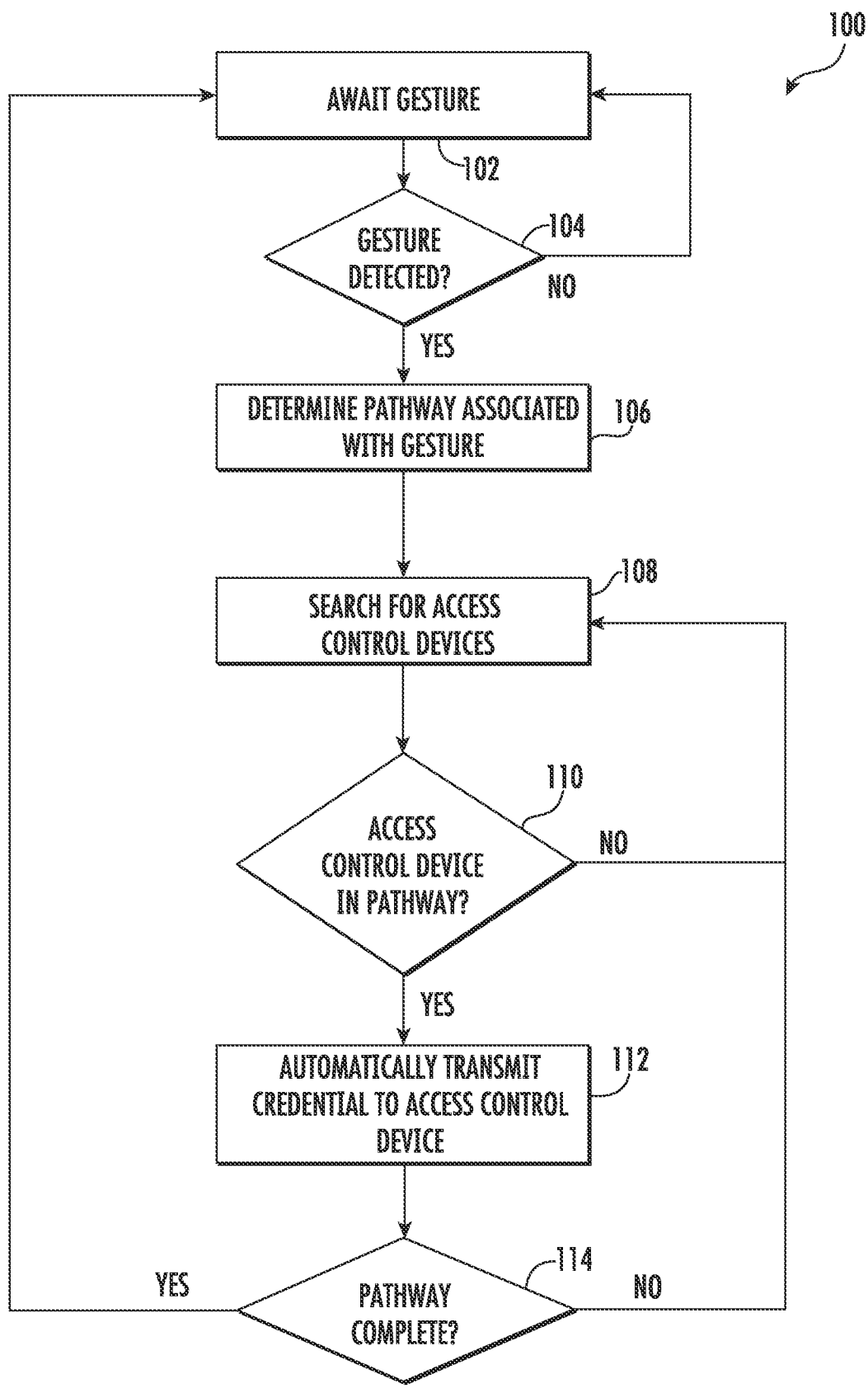
FIG. 3 is a flowchart representative of an example method of providing access to a plurality of secured areas.

FIG. 3 is a flowchart 100 representative of an example method implemented by mobile device 20 for providing access to a plurality of secured areas 12. The processor 30 of mobile device 20 awaits a gesture (block 102). Upon detecting a gesture (a "yes" to block 104), the mobile device 20 determines a pathway 10 associated with the gesture using its database 35 (or a database stored on another network-connected device) (block 106), and searches for access control devices 14 associated with the pathway 10 (block 108).

Upon detecting an access control device 14, the mobile device 20 determines whether the access control device 14 is part of the pathway (block 110) (e.g., through Bluetooth signaling and/or Bluetooth pairing). If the detected access control device 14 is the not part of the predefined pathway 10, the mobile device 20 continues searching for other access control devices 14 (block 108). Otherwise, if the detected access control device 14 is part of the predefined pathway 10, the mobile device 20 automatically transmits the credential 34 to the access control device 14 for authentication (block 112).

If the pathway is complete (a "yes" to block 114), the mobile device 20 stops searching for access control devices 14, and awaits a new gesture for the mobile device 20. In one example, pathway completion includes the mobile device 20 receiving a notification from each access control device 14 that it transmits the credential to that the credential was successfully authenticated.

If the pathway is not yet complete (a "no" to block 114), the mobile device 20 continues searching for access control devices 14 in the predefined path (block 108).

In one example, the mobile device 20 only transmits the credential 34 to access control devices 14 in an order corresponding to the predefined pathway (e.g., for pathway 10A, do not enable transmission to access control device 14B until credential has been transmitted to access control device 14A).

In one example, the mobile device 20 enables skipping access control devices 14 (e.g., allow transmission to access control device 14C even if access control device 14B was not found) if for some reason the user 18 was able to bypass an intermediate access control device 14 (e.g., because a door was held open by another person).

The security system described above allows a user to traverse a predefined pathway with a single gesture. Unlike prior art access control devices that have required repeated user intervention to provide a credential at each of a plurality of secured areas, the security system described herein conveniently allows the user 18 to provide a gesture once, and then have their credential automatically provided at each necessary access control device along a pathway corresponding to the gesture.

In one example, the mobile device 20 includes a training feature whereby a user defines a pathway by traversing the pathway, and the mobile device 20 records an ordered list of each access control device 14 of the pathway. The user can associate a particular gesture with the pathway learned through the training feature.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A security system comprising:
   a plurality of access control devices that each control access to a respective one of a plurality of secured areas; and
   a mobile device comprising a processor, an accelerometer, a wireless transceiver, and memory storing a credential, the processor configured to:
   receive accelerometer data from the accelerometer;
   detect a user gesture based on the accelerometer data indicating a predefined movement of the mobile device;
   determine a pathway based on the gesture, the pathway including multiple ones of the secured areas; and
   utilize the wireless transceiver to automatically transmit, based on a single performance of the gesture, the credential to the access control devices that control access to said multiple ones of the secured areas.

2. The security system of claim 1, wherein:
   the pathway comprises an ordered sequence of said multiple ones of the secured areas; and
   the mobile device is configured to transmit the credential to said access control devices that control access to said multiple ones of the secured areas in a same order as the ordered sequence.

3. The security system of claim 1, wherein the gesture comprises a plurality of predefined discrete movements of the mobile device.

4. The security system of claim 3, wherein the gesture comprises a pause of a predefined duration occurring between at least two of the discrete movements.

5. The security system of claim 1, wherein the gesture comprises one or more taps on the mobile device.

6. The security system of claim 1, wherein the gesture comprises a predefined bodily movement of a user holding or transporting the mobile device.

7. The security system of claim 1, wherein the gesture comprises a change in walking speed of a user transporting the mobile device.

8. The security system of claim 1, wherein the gesture comprises a predefined arm-based movement trajectory of the mobile device.

9. The security system of claim 1, wherein the mobile device comprises a microphone and the processor is configured to:
record audio from the microphone based on detection of the user gesture;
determine whether the recorded audio includes a predefined audio signature; and
determine the pathway further based on the predefined audio signature being detected in the recorded audio.

10. The security system of claim 1, wherein the wireless transceiver is configured to communicate with said respective access control devices using BLUETOOTH, WiFi, Zigbee, or Near-Field Communication.

11. The security system of claim 1, wherein the pathway includes multiple types of secured areas, including an elevator car secured area and a non-elevator car room secured area.

12. The security system of claim 1, wherein the access control devices that control access to said multiple ones of the secured areas include at least two of a turnstile, a gate, an elevator car door, and a non-elevator car door.

13. A method for a security system comprising:
detecting a user gesture based on accelerometer data from an accelerometer of a mobile device indicating a predefined movement of the mobile device;
determining a pathway based on the gesture, the pathway including a plurality of secured areas, each secured area having an associated access control device that controls access to the secured area; and
automatically transmitting a credential from the mobile device to the respective access control devices associated with each respective secured area of the pathway based on a single performance of the gesture.

14. The method of claim 13, wherein:
the pathway comprises an ordered sequence of said multiple ones of the secured areas; and
said automatically transmitting comprises transmitting the credential to the respective access control devices to provide access to said plurality of secured areas in a same order as the ordered sequence.

15. The method of claim 13, wherein the gesture comprises a plurality of predefined discrete movements of the mobile device.

16. The method of claim 15, wherein the gesture comprises a pause of a predefined duration occurring between at least two of the discrete movements.

17. The method of claim 13, wherein the gesture comprises one or more taps on the mobile device.

18. The method of claim 13, wherein the gesture comprises a predefined bodily movement of a user holding or transporting the mobile device.

19. The method of claim 13, wherein the gesture comprises a change in walking speed of a user transporting the mobile device.

20. The method of claim 13, wherein the gesture comprises a predefined arm-based movement trajectory of the mobile device.

21. The method of claim 13, comprising:
recording audio from a microphone of the mobile device based on detection of the user gesture;
determining whether the recorded audio includes a predefined audio signature; and
determining the pathway further based on the predefined audio signature being detected in the recorded audio.

22. The method of claim 13, wherein said automatically transmitting comprises transmitting the credential using BLUETOOTH, WiFi, Zigbee, or Near-Field Communication.

23. The method of claim 13, wherein the pathway includes multiple types of secured areas, including an elevator car secured area and a non-elevator car room secured area.

24. The method of claim 13, wherein the respective access control devices associated with each respective secured area of the pathway include at least two of a turnstile, a gate, an elevator car door, and a non-elevator car door.

* * * * *